Aug. 16, 1932.　　　　R. W. JOHNSON　　　　1,872,147
AUTOMATIC CONTROL DEVICE FOR GAS BURNERS
Filed Oct. 12, 1928　　　3 Sheets-Sheet 1

INVENTOR.
Roy W. Johnson
BY Bottum, Hudnall,
Lechner, McNamara & Michael
ATTORNEY.

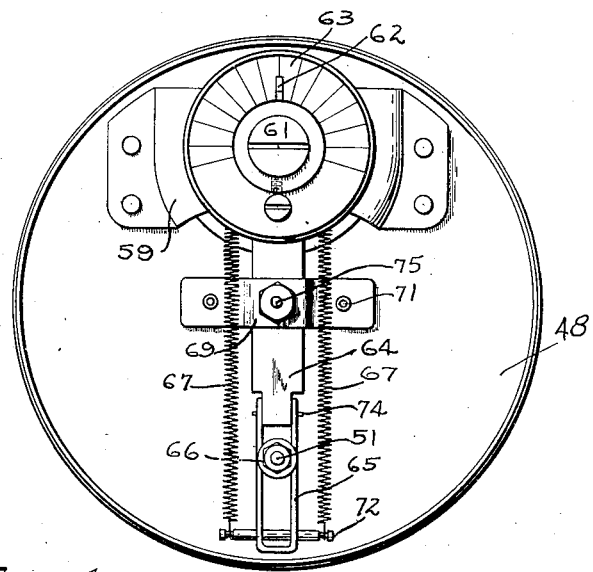
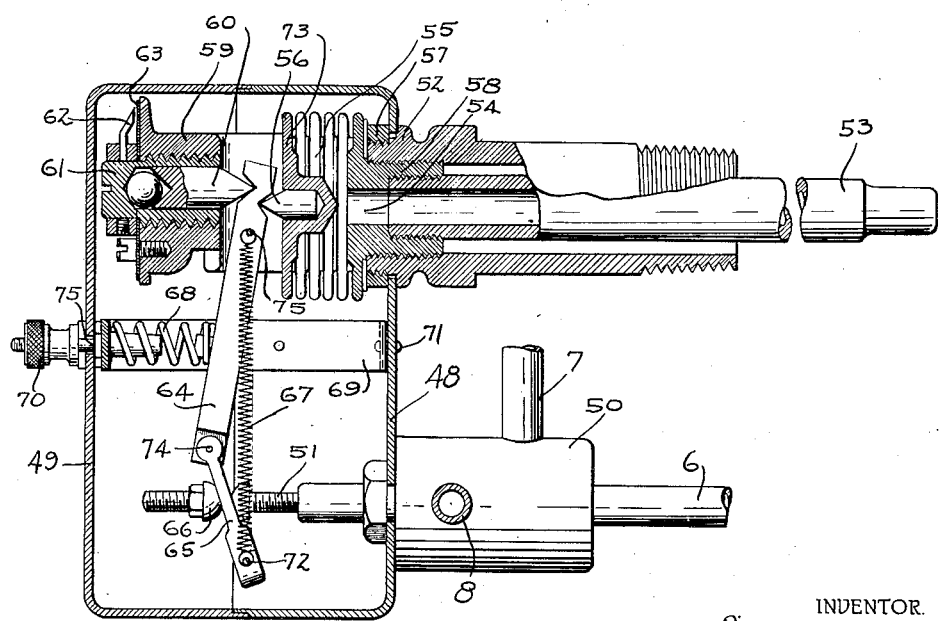

Aug. 16, 1932.  R. W. JOHNSON  1,872,147
AUTOMATIC CONTROL DEVICE FOR GAS BURNERS
Filed Oct. 12, 1928    3 Sheets-Sheet 3
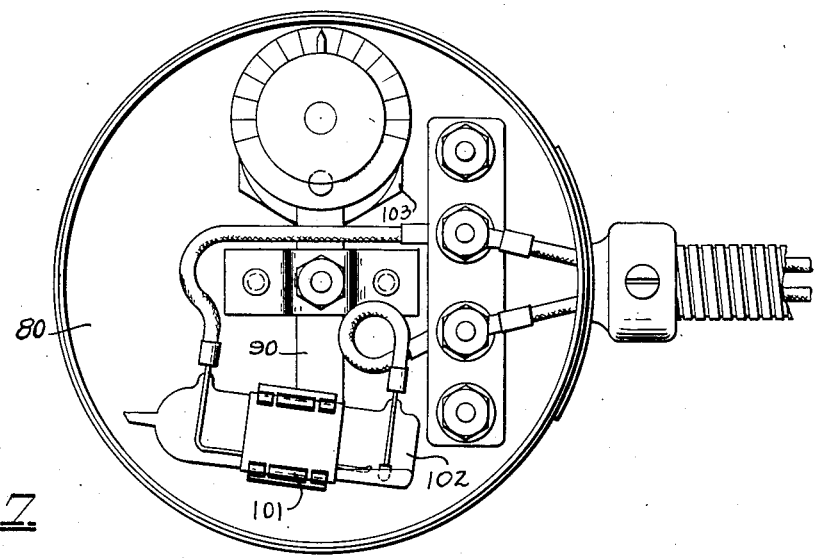
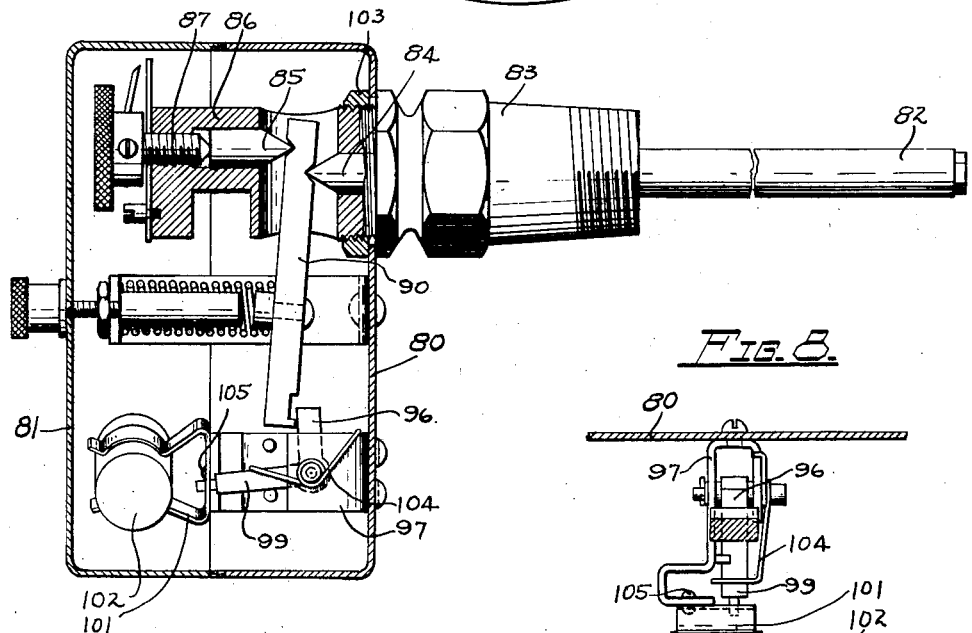
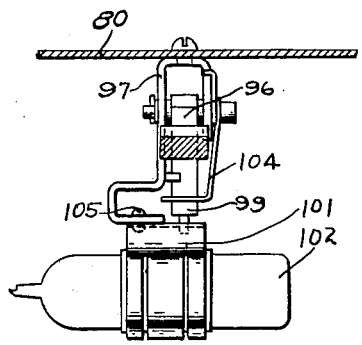
INVENTOR.
Roy W. Johnson
BY Bottum, Hudnall,
Lecher, McNamara & Michael
ATTORNEY.

Patented Aug. 16, 1932  1,872,147

UNITED STATES PATENT OFFICE

ROY W. JOHNSON, OF MILWAUKEE, WISCONSIN, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

AUTOMATIC CONTROL DEVICE FOR GAS BURNERS

Application filed October 12, 1928. Serial No. 312,052.

This invention relates to automatic control devices for heating systems and more particularly to control units for use in automatic systems which regulate the flow of gas to a burner or burners used in heating fluids.

Various types of control systems for gas burning equipment have been devised. An electrical system in which the supply of gas to the burner is controlled in accordance with conditions in a boiler or furnace with which the burner is associated, is shown and described in a copending application of Roy W. Johnson, Serial No. 302,413, filed August 27, 1928.

Various types of analogous gas pressure operated systems using some electrical apparatus are shown and described in a copending application of Roy W. Johnson, Serial No. 311,545, filed October 10, 1928. This application is a continuation in part of the above mentioned applications.

The present invention relates to boiler or furnace control units which may be used in the systems described in the above applications or in other systems in which control apparatus is used for regulating the flow of fluid fuel to a burner or burners and in which danger might ensue or damage be done if fuel is supplied to the burner when the temperature of the medium heated by the burners becomes excessively high.

An object of the invention is, therefore, to provide novel and automatically operating safety units in which a control device is actuated so as to cause the cutting off or preventing of flow of fuel to a burner when the temperature in a heater associated with the burner reaches a predetermined point.

A further object is to provide such a unit with a thermostatic element and with a movable control device so connected to the thermostatic element that small movement of the element will cause greater movement of the control device.

A big disadvantage in heater control units heretofore devised resulted from the multiplicity of parts used, which in many cases required considerable time and skill to install. An object of this invention is to provide safety control apparatus which is unitary and compact so that it may be installed by workmen who are not particularly skilled in the heating art.

Other objects reside in the provision of means for adjusting such a unit so that the apparatus may be regulated to respond to a predetermined temperature and in the provision of means for causing quick operation of the control device when that temperature is reached.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 4 is a side view, partly in cross section, of the control device of Figure 3;

Figure 6 is an end view, with the cover removed, of a further modification adapted for use with an electrically operated regulating system;

Figure 7 is a side view partly in cross section of the control unit of Figure 6;

Figure 8 is an end view of a switch and operating mechanism used in the control unit of Figures 6 and 7; and Figure 9 is a diagrammatic showing of the control unit of Figures 6, 7 and 8 showing how it is connected in an electrical system for controlling the flow of fuel to a burner.

Figure 1:
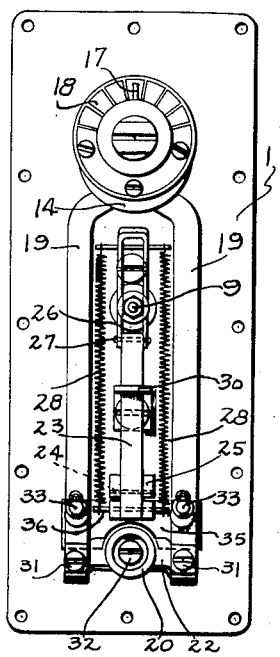
Figure 1 is an end view, with the cover removed, of one embodiment of the invention adapted for use in a hot water or hot air heating system.

In the drawings, the reference numeral 1 indicates a supporting base to which a cover 2 may be attached by suitable means such as screws 3 for housing the operating mechanism of a controlling device. A small two way valve 5 is mounted on the base 1 by means of screws 4. This valve may be of any suitable construction such as that described in the above mentioned copending application and is adapted to control the flow of fluid from an inlet pipe connection 7 to an outlet pipe 8 which are adapted to be connected with gas pressure operated mechanism for controlling the supply of gas for a burner as will be described hereinafter.

The valve 5 is so mounted that its stem 9 projects through the base plate 1 into the interior of the housing as shown. Mounted on the outside of the base plate 1 at its upper end is a coupling 10 which is secured to the plate by a nut 11 and which carries a thermostatic element 12 which has a portion 13 extending into the housing through the coupling 10. The thermostatic element may be of any suitable construction but preferably consists of an outer cylindrical member which has a high coefficient of expansion and an inner rod or core which has a low coefficient of expansion. The use of copper for the outer cylindrical member and of "invar" for the core have been found to be suitable for the purpose. The coupling 10 also carries a supporting block 14 which carries a pivot point 15 which may be adjusted laterally by the screw 16. The screw 16 is provided with a pointer 17 which travels over a dial 18 which may be marked with numerals indicating the temperature range over which the unit is adapted to operate. Pivotally mounted upon the fulcrum or pivot point 15 is a lever 19 the lower end of which is bifurcated so as to provide space for toggle mechanism with which it is connected. The lever 19 bears against the inner pointed end 13 of the thermostatic element 12 so as to be actuated thereby. To hold the lever 19 in operative position and to counteract the action of the thermostatic element, a spring 20 is mounted in the lower portion of the housing and is connected to the base plate 1 by a pin or rivet 21 and to the lower end of the lever 19 through an arched cross member or yoke 22 which is fastened to the lower ends of the lever 19 by the screws 31. A screw 32 is mounted on the outer end of the yoke to maintain the end of the spring in position thereon.

It will be seen that the spring 20 thus exerts a pressure upon the lever 19 in opposition to that exerted by the inner end 13 of the thermostatic element 12. The numerals 23, 26 and 28 refer to toggle mechanism for causing motion of the lower end of the lever 19 to operate the valve system 9 with a snap action. The toggle mechanism 23 is pivoted on a pin 24 mounted on a stud 25 secured to the base 1. At its upper end, the toggle line 23 carries a pin 27 to which a second toggle link 26 is pivotally secured. A coil spring 28 is connected to the upper end of the link 26 and to the lower end of the link 23 as shown. The upper toggle link 26 is of U shape so that it may surround the cone shaped nut 29 which is adjustably secured to the valve stem 9. Adjacent the lower end of the toggle link 23 and slidably mounted on the lower ends of the lever 19 is a cross piece 35 which is of a width a little greater than the distance between the outer sides of the ends of the lever 19. This cross piece is provided with studs 33 which project through the lower ends of the lever 19 and are secured thereto through the coil springs 34. The cross piece also carries a pivot pin 36 for the toggle link 23. A plate 30, having an opening therein so that it surrounds the toggle link 23, is mounted on the base so as to guide and limit the extent of motion of the toggle.

The operation of this unit is as follows:

With the unit mounted on a boiler or furnace so that the thermostatic element 12 is affected by the temperature therein, the expansion of the outer cylindrical portion of the thermostatic element causes the inner point 13 thereof to move to the right (Figure 2) permitting the spring 20 to move the lower end of the lever 19 to the right until it engages the projecting portions of the cross piece 35 which moves the lowermost end of the toggle link 23 to the right and causes the valve stem 9 to be moved to the right with a snap action as soon as the links 23 and 26 are moved beyond their dead center point. In the position shown and with the thermostatic element cold the valve 5 is in closed position but when the thermostatic element becomes heated to the temperature indicated upon the dial 18, the valve 5 is thus snapped open.

Figure 3:
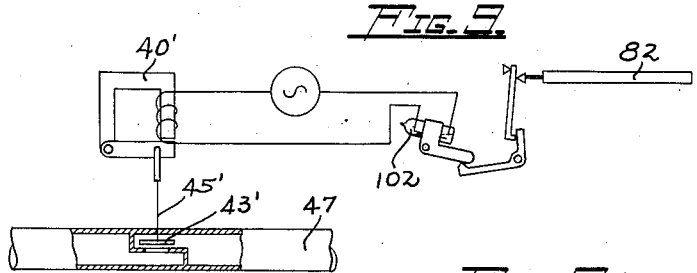
Figure 3 is an end view, with the cover removed, of a modified form of control unit for use in a hot air or hot water heating system.

Figures 3 and 4 show a modification in which a different form of thermostatic element and actuating means is used. In this construction, a base or housing plate 48 is provided with a cover 49 to enclose the movable parts of the device. Mounted on the outer side of the lower end of the base plate 48 is a three way valve 50 provided with connections 6, 7 and 8 which are so connected to a gas pressure operated device as to control the operation thereof as described hereinafter. The valve 50 may be of any suitable construction such as the three way control valve described in the above mentioned co-pending applications and is adapted to permit the flow of fluid from the connection 6 to the connection 7 when the stem 51 is to the left (Figure 4) and to permit the flow of fluid from the connection 7 to the connection 8 when the stem 51 is moved to the right (Figure 4). The stem 51 of the valve projects interiorly of the housing to be actuated by the mechanism therein.

Mounted on the upper end of the base plate 48 is a coupling 52 which may be secured to the base plate by a nut 57. This coupling carries a hollow tube 53 which is closed at its outer end and adapted to project into a boiler or furnace. The coupling also carries an expansion chamber 55 which has a pointed pin 56 secured to its inner end plate 73 for actuating the lever 64. The expansion chamber is connected to the tube 53 by a nipple 58 which has a passageway 54 therethrough leading to the tube 53. The tube 53 and expansion chamber 55 may be filled with ether or other expansible fluid for causing the inner plate 73 of the expansion chamber to move to the left (Figure 4) when the tube 53 becomes heated. The base also carries a supporting block 59 upon which a fulcrum or pivot point 60 is mounted through an adjustable screw 61 which carries a pointer 62 adapted to move over an indicating dial 63 similar to the dial 18 of the embodiment described above. In this modification, the lever 64 itself constitutes one of the toggle links for actuating the valve stem 51. A pin 74 is provided at the lower end of the lever 64 for pivotally supporting a U-shaped toggle link 65, which carries at its lower end a transverse pin 72. Coil springs 67 are connected to the pin 72 and to a similar pin 75 secured to the lever 64 adjacent its upper end. The U-shaped link 65 is adapted to surround a cone shaped nut 66 on the valve stem 51, as in the embodiment first described.

A yoke or bracket 69 is secured to the base 48 by pins 71 for supporting a bolt 75 which cooperates with a nut 70 to secure the cover 49 to the base and for supporting a coil spring 68 which urges the lever 64 to the right (Figure 4) against the pressure exerted thereon by the expansion chamber 55.

Figure 2:
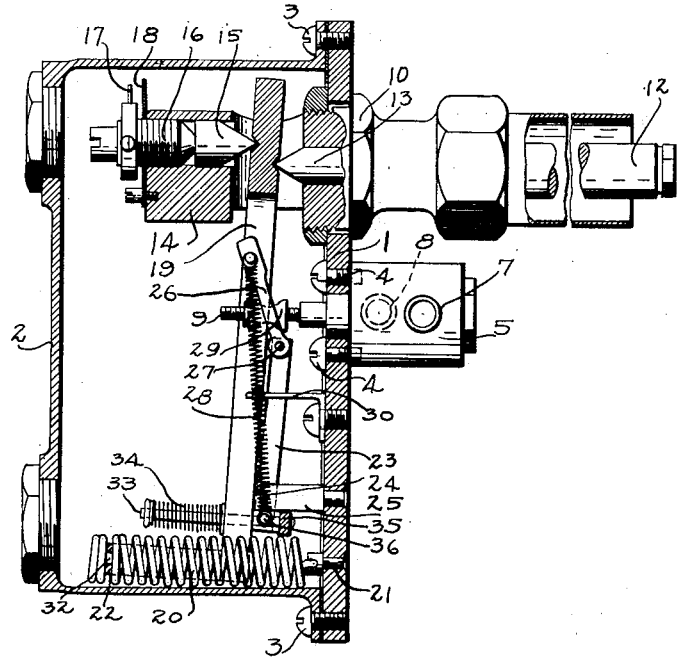
Figure 2 is a side view, partly in cross section, of the control unit of Figure 1.

The operation of the device of this modification is similar to that of the device of Figures 1 and 2. With the parts in the position shown in Figure 4, the fluid in the expansion chamber is heated and expanded and the valve stem 51 is moved to the right. Upon the expansion chamber contracting, the lower end of the lever 64 moves to the right beyond its dead center point with respect to link 65, causing the link 65 to snap to the left and move the valve stem to the left. It is thus obvious that either a two way valve or a three way valve may be operated by either of the above described devices. In both embodiments of the invention, the valve stem is moved to the right upon the temperature in the boiler or furnace with which the devices are associated, rising to a predetermined point as indicated upon the dial adjacent the adjustable fulcrum.

Figure 5:
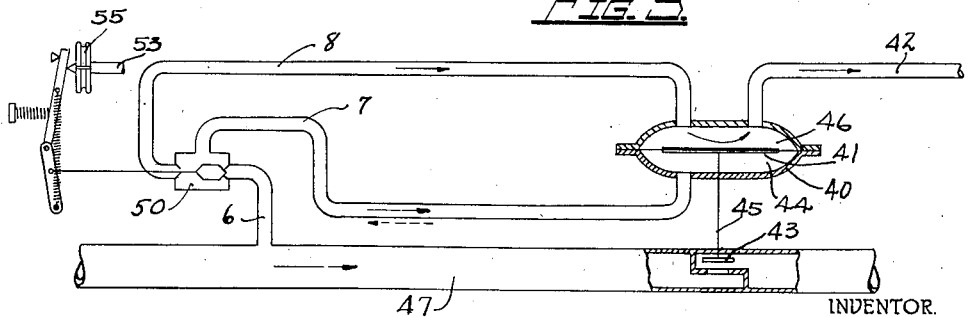
Figure 5 is a diagrammatic showing of the control unit of Figures 3 and 4 showing how it is connected with a gas pressure operated device for controlling the flow of fuel to a burner.

Referring now to Figure 5, which shows diagrammatically the control unit of Figures 3 and 4 in a system for controlling the passage of gas through a main supply line 47, the valve 50 is shown with its connecting pipes 6, 7 and 8 connected to the supply line and to a gas pressure motor 40. A main valve 43 in the line 47 is actuated by a stem 45 connected to a diaphragm 41 in the gas pressure motor the diaphragm dividing the motor into upper and lower chambers 46 and 44. Gas is supplied to the valve 50 from the main supply line 47 through a pipe 6. With the valve in the position shown in this figure the fluid in the expansion chamber 55 is hot and gas cannot pass from the pipe 6 through the pipe 7. Upon the fluid of the expansion chamber cooling, the valve is moved to the left and gas may pass from the pipe 6 to the pipe 7 and to the lower compartment 44 of the fluid pressure motor. The pressure on the diaphragm 41 will cause the valve 43 to open. Upon the thermostatic element 53 becoming heated, it will expand and cause its pivot point to move control valve 50 to the right, cutting off the supply of gas through the pipe 6 and permitting gas in the lower compartment 44 to be bled back through the pipe 7, through the pipe 8 and through the upper compartment of the motor to a bleed line 42 which may lead to a point adjacent the burner in the boiler or furnace to prevent escape of unignited gas to the atmosphere.

In the device of Figures 1 and 2 a two way valve 5 is shown having connecting pipes 7 and 8. In using such a valve, the pipe 6 of Figure 5 may be connected to the pipe 7 directly and a restriction placed in the pipe 7 between its point of connection with the pipe 6 and the gas pressure motor. In such an arrangement, upon the temperature of the thermostatic element rising to a predetermined point, the pressure in the lower compartment of the gas motor will be relieved by the opening of the control valve which will permit gas to be bled from the pipe 6 to the upper compartment of the motor and to the main burner. Otherwise, such a system operates as that shown in Figure 5.

Figures 6 and 7 show a device adapted to be used in an electrical control system. This unit may consist of a casing 80 provided with a cover 81 adapted to enclose a mercury switch 102 and apparatus for actuating the same. The unit is secured upon the side of a boiler or furnace by the screw threaded nipple 83 secured to the outer side thereof by the nut 103. The nipple 83 carries a thermostatic expansion element 82 similar to the thermostatic element 12 of the embodiment shown in Figures 1 and 2. The element has a pivot point 84 at its inner end adapted to be moved to the right as viewed in Figure 2 upon the expansion of the element 82. A second pivot point or fulcrum 85 is adjustably mounted by means of the screw 87 upon the bracket 86 as in the construction described above. The lever 90 is mounted so as to be actuated by the thermostatic element against the action of a spring 95 carried by a yoke 94 secured to the base plate 80. A projection 91 is also carried by the yoke and is adapted to engage a projection 93 secured to the lever for limiting the motion thereof to the left (Figure 7). The lower end of the lever 90 engages the upper end of a crank or angular lever 96 pivoted to a bracket 97 as shown. A small coil spring 104 tends to hold the crank in the position shown in Figure 7. A mercury switch 102 which may be of any suitable construction (the one shown being of the type having a glass tube having two electrodes) is mounted in a clamp 101 which is pivoted to the bracket 97 by a pin 105 and is adapted to be tilted by an arm of the crank 99.

Thus, when the thermostatic element 82 expands upon temperature in the boiler rising to a point higher than that for which the screw 87 is set, the lower end of the lever 90 will be moved to the right to cause the crank to move the switch to open position.

Figure 9 illustrates a system adapted to be operated by such a control unit. Valve 43′ in the main supply line 47′ is adapted to be actuated through a valve stem 45′ by an electro-magnet 40′. The mercury switch 102 is connected in a circuit with the magnet and when closed causes the magnet to hold the valve in open position. Upon the thermostatic element 82 expanding the circuit is broken and the electro-magnet 40 is deenergized and the valve 43′ is closed.

In all of the modifications herein shown, it will be seen that the actuating levers, such as the lever 19 of Figures 1 and 2, are of the third class, that is, the applied force and the resistance are on the same side of the fulcrum the former being nearer the fulcrum than the latter. Thus, when force is applied by the thermostatic element the lower end of the lever which offers resistance to the force applied at the thermostatic element, has greater movement than the point of application of the force. The lever thus has a mechanical advantage less than unity. By mechanical advantage is meant the ratio of the resistance to the applied force. By using such a device, only small movement of the thermostatic element, or its equivalent, is necessary to operate the control valve.

It is obvious that many changes may be made in the details of the construction and in the arrangement of the parts of the various embodiments of the invention described above. It is, therefore, to be understood that such changes may be made without departing from the spirit of the invention or in the scope of the annexed claims.

The invention claimed is:

1. In an apparatus of the character described for controlling the flow of fuel to a burner of a heating system, comprising a support, a bracket removably secured to the support on one side and having a portion spaced outward therefrom, a substantially straight lever on the same side of the support as the bracket and having a portion disposed in the space between the bracket and the support, a heat responsive device on the other side of the support and having a movable element extending therethrough into the space between the bracket and the support and engaging the lever on its side facing the support, a fulcrum member on the bracket on the opposite side of the lever extending into the space between the bracket and the support and engaging the lever in offset relation longitudinally to the engagement of the lever by the movable element, said fulcrum member and element serving to support the lever from the bracket, and a mechanism operated by the movement of the lever to control the flow of fuel to the burner.

2. In an apparatus of the character described for controlling the flow of fuel to a burner of a heating system, comprising a support, a block removably secured to the support on one side and having an opening therein, a lever on the same side of the support as the block and having a portion disposed in said opening, a heat responsive device on the other side of the support and having a movable element extending into said opening and engaging the portion of the lever therein, a fulcrum member on the block on the other side of the lever and extending into said opening to engage the lever, and means operable by the lever in its movement to control the flow of fuel to the burner.

3. In an apparatus of the character described for controlling the flow of fuel to a burner of a heating system, comprising a support, a bracket on the support on one side and having a portion spaced outward from the support, a substantially straight lever on the same side of the support as the bracket and having a portion disposed in the space between the bracket and the support, a heat responsive device on the other side of the support and having a movable element extending to and engaging the lever on one side, a fulcrum member carried by the bracket and engaging the lever on the other side in off-set relation longitudinally of the engagement of the lever by the element, said fulcrum member being adjustable in the bracket toward and from the lever, a scale carried by the bracket, a pointer associated with the fulcrum member and movable therewith over the scale in the adjusting of the fulcrum member, and means operable by the lever in the movement thereof to control the supply of fuel to the burner.

4. In an apparatus of the character described, for controlling the flow of fuel to a burner of a heating system, comprising a support, a bracket carried by the support on one side and having a portion spaced outward from the support, a substantially straight lever on the same side of the support as the bracket and having a portion in the space between the bracket and the support, a heat responsive device on the other side of the support and having a movable element extending to and engaging the lever on one side, a fulcrum member slidably carried by the bracket and engaging the lever on the other side in off-set relation longitudinally to the engagement of the lever by the element, an adjustable member carried by the bracket at the fulcrum member and cooperable therewith to adjust the fulcrum member toward and from the lever, and means operable by the lever to control the flow of fuel to the burner.

5. In combination, a valve device for controlling the flow of fuel to a burner, and means for operating said valve device in response to heat conditions created by the burner, said means comprising a single lever, a fulcrum member engaging the lever on one side, a heat responsive device engaging the lever on the opposite side for moving the lever in one direction, means for moving the lever in the opposite direction, and means connecting the lever to the valve device and operable across the lever whereby the valve will be given a quick snap movement in the actuation of the lever to open and close the valve.

6. In combination, a valve device for controlling the flow of fuel to a burner, and means for operating said valve device in response to heat conditions created by the burner, said means comprising a single lever, a fulcrum member engaging the lever on one side, a heat responsive device engaging the lever on the opposite side for moving the lever in one direction, means for moving the lever in the opposite direction, and a spring actuated toggle mechanism connecting the valve device to the lever and operable across the lever whereby a quick snap movement will be imparted to the valve in the opening and closing of the same by the lever.

7. In combination, a valve device for controlling the flow of fuel to a burner, and means for operating said valve device in response to heat conditions created by the burner, said means comprising a single lever, a fulcrum member engaging the lever on one side, a heat responsive device engaging the lever on the opposite side for moving the lever in one direction, means for moving the lever in the opposite direction, and a toggle mechanism connecting the lever to the valve and operable across the lever whereby the valve will be given a quick snap action in the movement of the lever to open and close the valve, said toggle mechanism having pivotally connected links, and a spring for moving the same across a dead center position.

8. In combination, a valve device for controlling the flow of fuel to a burner, and means for operating said valve device in response to heat conditons created by the burner, said means comprising a lever fulcrumed between its ends, said lever being slotted longitudinally, a heat responsive device for moving the lever in one direction, means for moving the lever in the opposite direction, and a spring actuated toggle mechanism connecting the lever with the valve device for imparting a quick snap movement thereto, in the opening and closing of the valve by the lever, said toggle mechanism being disposed to operate in the slot in said lever.

9. In combination, a valve device for controlling the flow of fuel to a burner, said valve device having a valve with a stem, and means for operating said valve device, comprising a lever fulcrumed adjacent one end, said lever being slotted longitudinally, a heat responsive device for moving the lever in one direction, means for moving the lever in the opposite direction, and a toggle mechanism connecting the lever with the valve through the stem thereof for imparting a quick snap movement to the valve, in the opening and closing of the same by the lever, said stem and toggle mechanism operating in the slot of the lever.

10. In combination, a support, a lever fulcrumed thereon adjacent one end, a valve device on the support and having a stem, a heat responsive device for moving the lever in one direction, means for moving the lever in the opposite direction, a toggle mechanism for giving a quick snap movement to the valve in the movement of the lever, said toggle mechanism comprising a pair of pivotally connected links, one link being free and the other being pivoted on the support and to the lever, respectively, and a spring for moving the links on opposite sides of a dead center position in the movement of one link by the lever.

11. In combination, a support, a lever fulcrumed thereon adjacent one end, a valve device mounted on the support and having a valve with a stem, a heat responsive device for moving the lever in one direction, means for moving the lever in the opposite direction, and a toggle mechanism connecting the lever with the valve for imparting a quick snap movement thereto in the opening and closing of the valve by the lever, said toggle comprising a pair of pivotally connected links and a spring for snapping the same on opposite sides of a dead center position, one of said links being pivoted to the support and the lever, the other link being free and in bifurcated form straddling the stem of the valve, and a cone-shaped member on the stem with which the legs of the slotted link have engagement.

In witness whereof, I have hereto affixed my signature.

ROY W. JOHNSON.